US010677239B2

(12) United States Patent
Hampton et al.

(10) Patent No.: US 10,677,239 B2
(45) Date of Patent: Jun. 9, 2020

(54) SOLENOID ACTIVATED VACUUM PUMP FOR AN ENGINE SYSTEM AND SYSTEM HAVING SAME

(71) Applicant: Dayco IP Holdings, LLC, Troy, MI (US)

(72) Inventors: Keith Hampton, Ann Arbor, MI (US); David E. Fletcher, Flint, MI (US); Brian M. Graichen, Leonard, MI (US); James H Miller, Ortonville, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 16/138,270

(22) Filed: Sep. 21, 2018

(65) Prior Publication Data

US 2019/0085835 A1   Mar. 21, 2019

Related U.S. Application Data

(60) Provisional application No. 62/561,249, filed on Sep. 21, 2017.

(51) Int. Cl.
*F04B 45/027* (2006.01)
*F04B 35/04* (2006.01)
(Continued)

(52) U.S. Cl.
CPC .......... *F04B 45/027* (2013.01); *F04B 35/045* (2013.01); *F04B 43/04* (2013.01);
(Continued)

(58) Field of Classification Search
CPC ...... F04B 453/08; F04B 45/06; F04B 45/067; F04B 45/065; F04B 43/086; F04B 45/022;
(Continued)

(56) References Cited

U.S. PATENT DOCUMENTS 2,257,862 A * 10/1941 Sarver .................. F04B 45/022
417/338
3,827,452 A   8/1974 Baumgarten
(Continued)

FOREIGN PATENT DOCUMENTS

DE   102007017731 A1   10/2008
DE   102014211218 A1   12/2015
(Continued)

OTHER PUBLICATIONS

WO, International Search Report with Written Opinion; PCT Application No. PCT/US2018/52234 (dated Jan. 17, 2019).

*Primary Examiner* — Bryan M Lettman
(74) *Attorney, Agent, or Firm* — FisherBroyles, LLP; Susan M. Oiler

(57) ABSTRACT

Start-stop engine systems for a turbocharged engine have a bypass with fluid flow from upstream of the compressor or downstream of the compressor to a position between the throttle and the engine, or from between the compressor and throttle to a position upstream of the compressor with a Venturi device in the bypass. A device requiring vacuum is in fluid communication with a suction port of the Venturi device. An electronic vacuum pump is added that is in fluid communication with the device requiring vacuum or with the Venturi device. The electronic vacuum pump is operated during a stop condition of the start-stop engine to replace the vacuum generated by the Venturi device or to provide a pressure drop across the Venturi device so the Venturi device continues to generate vacuum for the device requiring vacuum.

20 Claims, 9 Drawing Sheets

(51) Int. Cl.
*F04B 43/04* (2006.01)
*F04B 45/067* (2006.01)
*F04B 45/06* (2006.01)
*F02M 35/10* (2006.01)
*F02B 33/44* (2006.01)
*F02B 37/16* (2006.01)

(52) U.S. Cl.
CPC .......... *F04B 45/065* (2013.01); *F04B 45/067* (2013.01); *F02B 33/44* (2013.01); *F02B 37/164* (2013.01); *F02M 35/10229* (2013.01)

(58) Field of Classification Search
CPC ........ F04B 43/09; F04B 45/02; F04B 45/027; F04B 43/023; F04B 43/04; F04B 45/043; F04B 45/041; F04B 45/047; F04B 43/08; F04B 35/045
See application file for complete search history.

(56) References Cited

U.S. PATENT DOCUMENTS

| | | | | |
|---|---|---|---|---|
| 4,406,591 A | * | 9/1983 | Louis | .................... F04B 45/027 417/363 |
| 4,585,397 A | | 4/1986 | Crawford et al. | |
| 4,608,000 A | * | 8/1986 | Tominaga | ............ F04B 45/027 310/30 |
| 6,554,587 B2 | * | 4/2003 | Paolini | .................. F04B 43/023 417/412 |
| 6,732,718 B2 | | 5/2004 | Kano et al. | |
| 9,534,704 B2 | | 1/2017 | Hampton et al. | |
| 9,827,963 B2 | | 11/2017 | Fletcher et al. | |
| 10,024,458 B2 | | 7/2018 | Niedert et al. | |
| 2005/0095142 A1 | * | 5/2005 | Ikeda | .................... F04B 35/045 417/174 |
| 2008/0164753 A1 | | 7/2008 | Crombez et al. | |
| 2011/0274566 A1 | * | 11/2011 | Amirouche | ....... A61M 5/14224 417/322 |
| 2016/0051740 A1 | * | 2/2016 | Wegener | ............. A61M 1/1055 417/53 |
| 2016/0153472 A1 | | 6/2016 | Fletcher et al. | |

FOREIGN PATENT DOCUMENTS

| | | |
|---|---|---|
| EP | 2589807 A1 | 5/2013 |
| GB | 718199 | 11/1954 |
| GB | 2273133 B | 10/1995 |
| JP | 2009185736 A | 8/2009 |
| KR | 101147077 B1 | 5/2012 |

* cited by examiner

SOLENOID ACTIVATED VACUUM PUMP FOR AN ENGINE SYSTEM AND SYSTEM HAVING SAME

RELATED APPLICATIONS

This application claims the benefit of U.S. Provisional Application No. 62/561,249, filed Sep. 21, 2017, which is incorporated herein by reference in its entirety.

TECHNICAL FIELD

The invention relates to an electrically operable vacuum pump for use in engines to assist in the generation of vacuum for use by a device requiring vacuum, more particularly, a vacuum pump having a piston comprising a compliant material and a magnetic material attractable to a solenoid assembly within the same housing that moves the piston at its natural frequency and engine systems having the same.

BACKGROUND

The requirement for fuel economy improvements, engine downsizing, start-stop engine technology, and the use of diesel technology in automotive vehicles has led to several factors that have reduced the availability of vacuum to operate vehicle system(s), for example a brake boost system. Existing electric vacuum pumps are large, expensive, and inefficient. Thus, there is a need to supplement or completely replace the source of vacuum in the engine system with a compact, inexpensive, and more efficient vacuum pump, especially one that generates vacuum for a start-stop engine when the engine is off, i.e., when the vehicle engine is coasting, at a stop light or stop sign, or applying the breaks.

DETAILED DESCRIPTION

Figure 1:
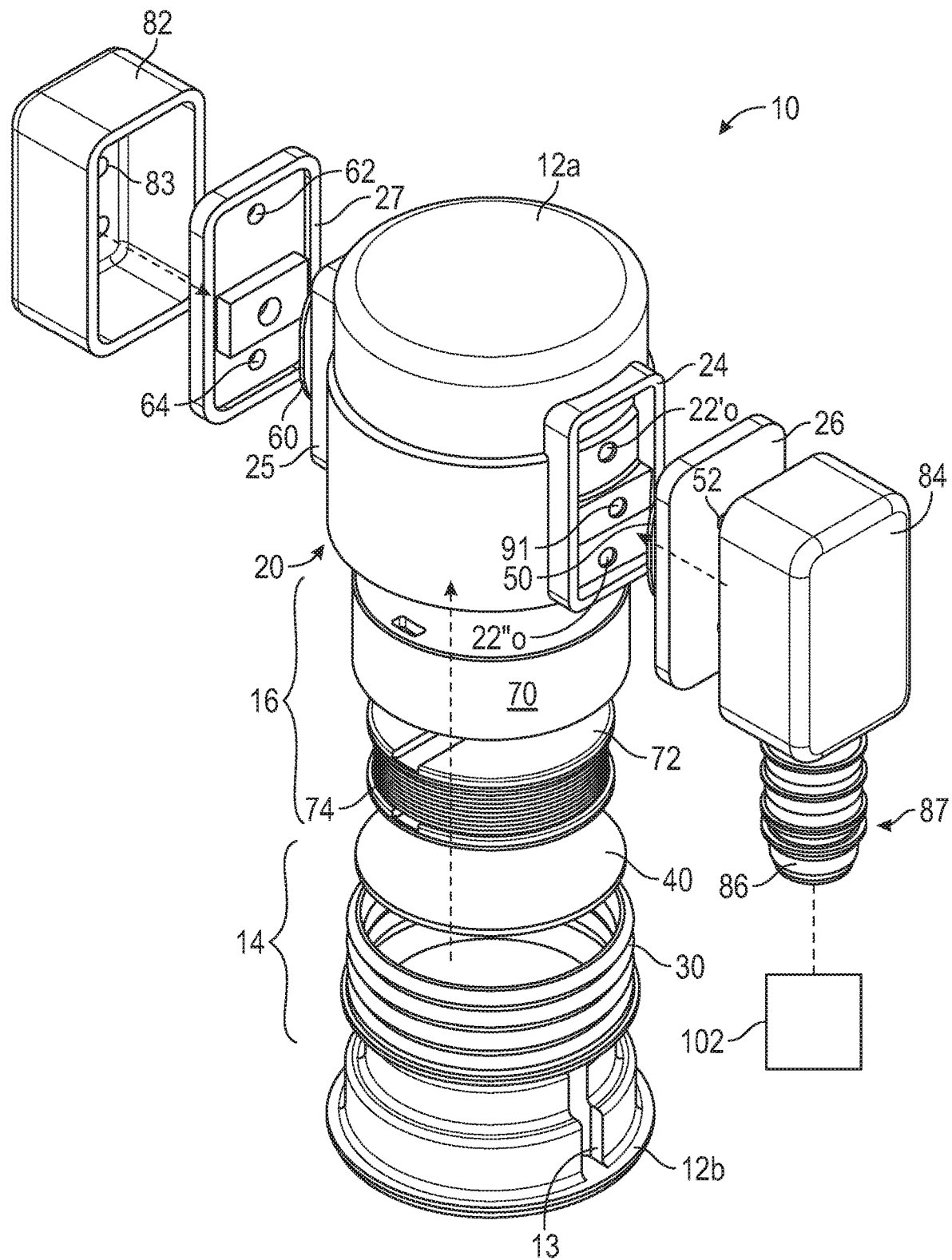
FIG. 1 is an exploded, side perspective view of an electrically actuated vacuum pump.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 4:
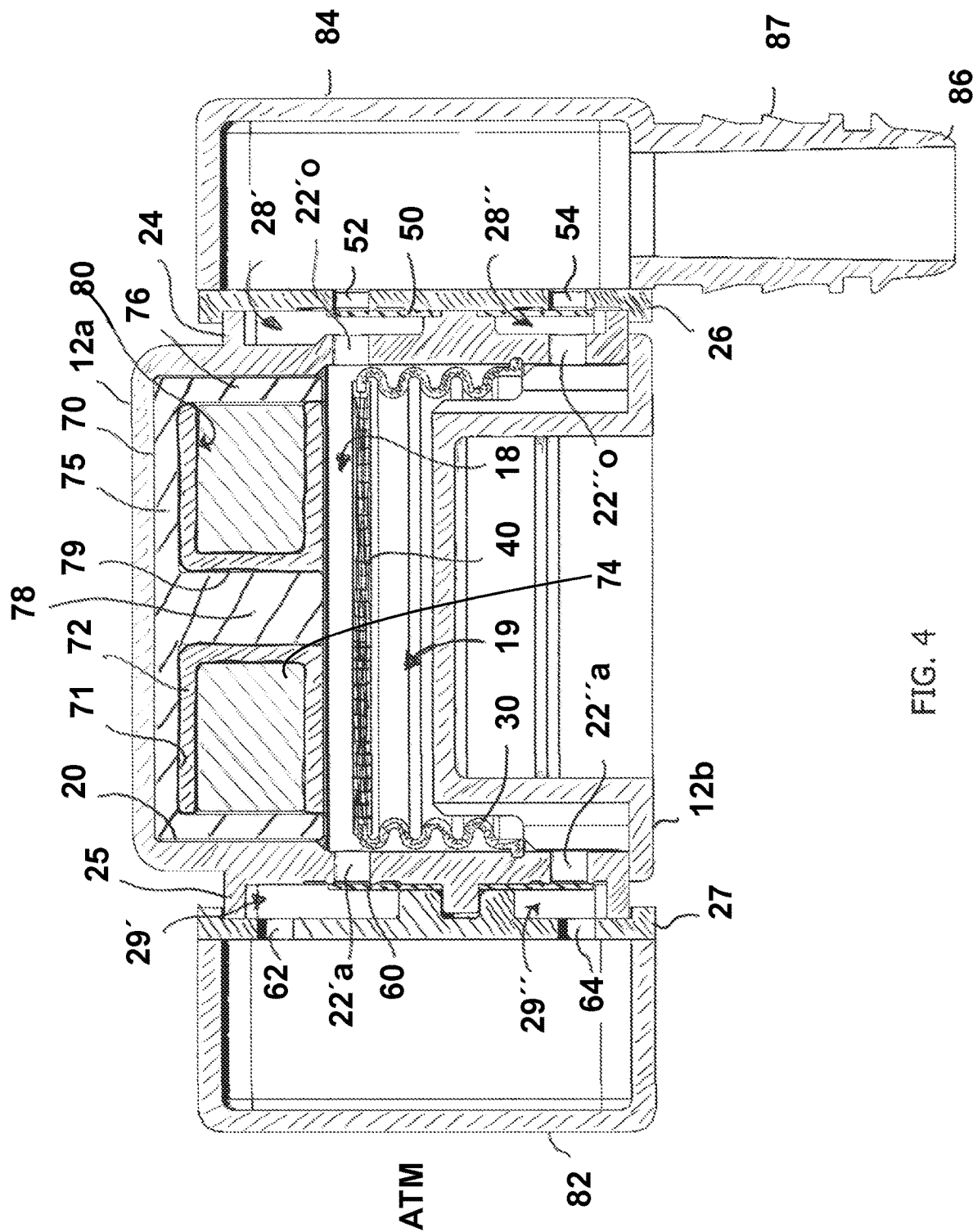
FIG. 4 is a longitudinal cross-section, assembled view of the vacuum pump of FIG. 1.

FIGS. 1 and 4 illustrate different views of an electrically actuated vacuum pump 10. The vacuum pump 10 may be used in an engine, for example, in a vehicle's engine to provide vacuum to a device. In FIG. 1 the vacuum pump 10 is connected to a device requiring vacuum 102, and the vacuum pump 10 creates vacuum for said device 102 by the flow of air through a housing 12 in response to the movement of a piston 14 relative to a solenoid assembly 16. The housing 12 is a two-part construction that sealing mate together to define a cavity 20, e.g., a first section a and a second section b. In one embodiment, the first section a and the second section b of the housing 12 may be plastic injection molded components fixedly mated together using a plastic welding process. The cap 12b protrudes into the cavity 20 and has a channel 13 recessed into the surface defining an interior surface of the cavity to enhance fluid flow during operation of the vacuum pump.

The cavity 20 defines a plurality of holes 22 for fluid communication between an exterior environment and the cavity. Enclosed within the cavity 20 of the housing 12, is the first solenoid assembly 16 and the piston 14. The piston 14 comprising an elastic base 30 having a first end 32 sealingly closed by a plate of magnetic material 40 and having a second end 34 sealingly connected to the housing, thereby dividing the cavity 20 of the housing 12 into a first chamber 18 and a second chamber 19 on opposite sides of the piston 14. Two of the plurality of holes 22' are in fluid communication with the first chamber 18, with one hole 22'a for fluid communication with atmosphere ATM and the other hole 22'o for fluid communication with an operating system of an engine (device requiring vacuum 102), and another two of the plurality of holes 22" are in fluid communication with the second chamber 19, with one hole 22"a for fluid communication with atmosphere ATM and the other hole 22"o or fluid communication with an operating system (device requiring vacuum 102). The piston 14 is positioned within the cavity 20 to place the plate of magnetic material 40 within an operable range for magnetic attraction to the solenoid assembly 16.

As shown in FIG. 4, the vacuum pump has a first neck 24 protruding from its exterior at a position that surrounds the holes 22'o and 22"o. Once assembled, a cap 26 is sealing mated to the first neck 24 to define a plurality of antechambers 28, one each in fluid communication with one of the plurality of holes 22'o and 22"o. The cap 26 has a first hole 52 for fluid communication with hole 22'o through the antechamber 28' and a second hole 54 for fluid communication with hole 22"o through antechamber 28". Seated with the antechambers 28 is a check valve 50. The check valve 50 is seated between the housing 12 and the cap 26 such that it is seated against the cap 26 to sealingly cover the first hole 52 and the second hole 54, one each with a flap of material which is independently moveable in response to pressure changes.

The vacuum pump has a first neck 25 protruding from its exterior at a position that surrounds the holes 22'a and 22"a. Once assembled, the neck 25 is sealingly mated to a cap 27 to define a plurality of antechambers 29, one each in fluid communication with one of the plurality of holes 22'a and 22"a. The cap 27 has a first hole 62 for fluid communication with hole 22'a through the antechamber 29' and a second hole 64 for fluid communication with hole 22"a through antechamber 29". Seated with the antechambers 29 is a check valve 60. The check valve 60 is seated between the housing 12 and the cap 27 such that it is seated against the exterior of the housing 12 to sealingly cover the holes 22'a and 22"a, one each with a flap of material which is independently moveable in response to pressure changes.

Figure 3:
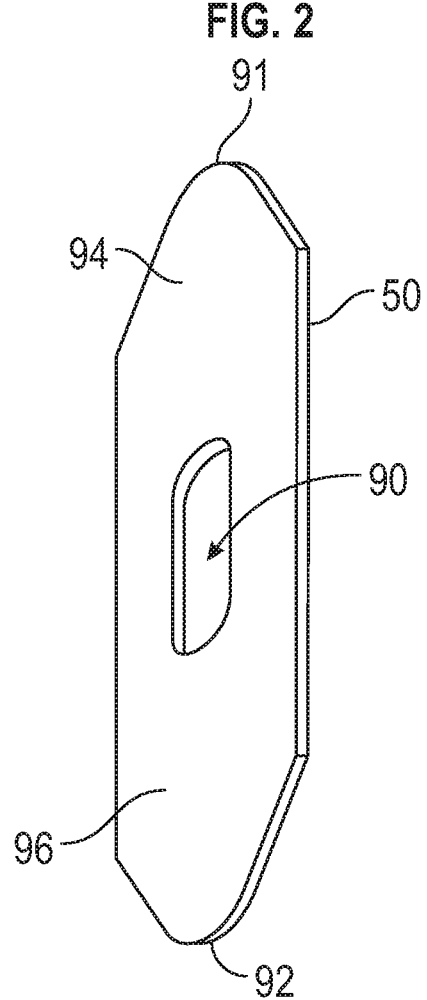
FIG. 3 is a front perspective view of one of the check valves in the electrically actuated vacuum pump of FIG. 1.

Turning to FIG. 3, the check valve 50 is described in more detail below, which is equally applicable to check valve 60. The check valve 50 is an elongate member having a first end 91 and a second end 92 and defining an opening 90 therethrough that is centrally positioned between the first and second ends. The portion of the check valve 50 between the first end 91 and the opening 90 forms a first flap 94, and the portion of the check valve 50 between the second end 92 and the opening 90 forms a second flap 96. At least the first flap 94 and the second flap 96 of the check valve 50 is made of a flexible, bendable material that will seal the hole 22'o and hole 22"o, respectively, when seated there against, but will bend away from the holes in response to a pressure change to allow fluid to flow therethrough. The flaps 94 and 96 are operable to bend between a closed position and an open position based only on pressure changes in the system. There is no spring, coil spring or otherwise, present to assist the flaps. The opening 90 in the check valve is sized and shaped to receive a protrusion 91 (FIG. 1), which is positioned within the first neck 24 between the holes 22'o and 22"o, to position the check valve 50 so that the first and second flaps 94, 96 cover the holes 22'o and 22"o.

Figure 2:
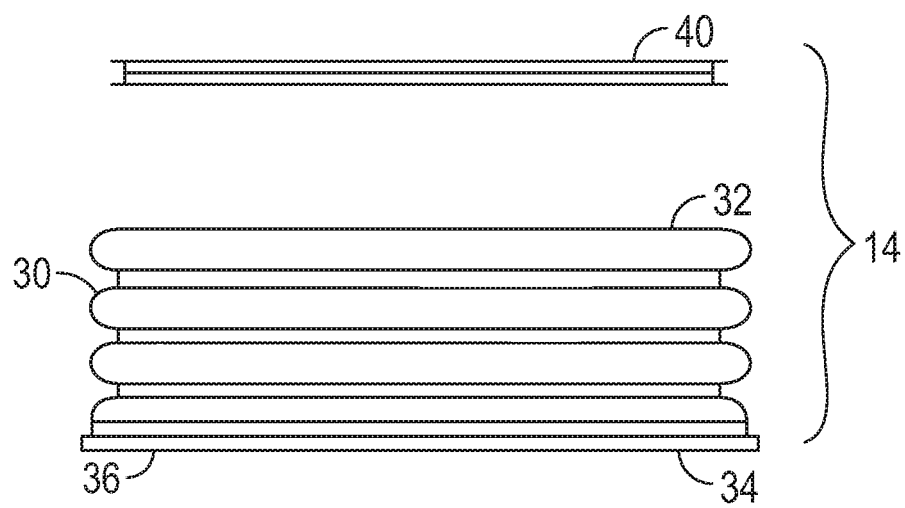
FIG. 2 is an enlarged, exploded, front plan view of the piston base and the plate of magnetic material from FIG. 1.

Referring to FIG. 2 for a better detailed view, the piston 14 comprises the plate of magnetic material 40 and an elastic base 30. The plate of magnetic material 40 has a recess 42 in a face or faces thereof for sealingly receiving a feature of the first end 32 of the elastic base 30. The plate of magnetic material can be a washer made from a soft magnetic material to a permanent magnet material. The washer could be exposed to a magnetic field during manufacture to establish render it a permanent magnetic. The elastic base 30 a feature 36, such as a flange or bead, at its second end 34 for sealingly engaging an interior surface of the housing within cavity 20. The elastic base 30 is made of a material that has spring characteristics to bias the plate of magnetic material 40 toward the solenoid assembly 16, has sealing characteristics to sealingly subdivide the cavity 20 into the first and second chambers 18, 19, and has elastic characteristics to be able to extend toward the solenoid assembly 16 when the solenoid is activated and attracts the plate of magnetic material thereto. The elastic base 30 may be bellowed and may be annular as shown in the figures.

Referring now to FIGS. 1 and 4, the solenoid assembly 16 comprises a core 70 of a magnetic material defining a cavity 71 recessed therein in which is seated a bobbin 72 housing a winding 74. In this exemplary embodiment, the core 70 may be generally E-shaped when viewed as a longitudinal cross-section (FIG. 4), however, it is to be appreciated that, in three dimensions the core 70 has an outer diameter ring 76 and an inner diameter post 78 both extending from a plate 75 in the same direction, but is not limited thereto. Seated within the cavity 71, defined between the outer diameter ring 76 and the inner diameter post 78, is a bobbin 72 housing a winding 74 of wire that can carry a current. In one embodiment, the bobbin 72 may be constructed of plastic, and may be manufactured by a plastic injection molding process. Although a plastic injection molding process is described, it is to be understood that other approaches and materials may be used as well to manufacture the bobbin. The bobbin 72 shown in FIG. 4 is an annular ring defining a central bore 79 that has received therein the inner diameter post 78 and defining a radially outward facing cavity 80, which when viewed in a longitudinal cross-section has a generally C-shaped cross section for each half of the bobbin. The winding 74 may be any type of wire for carrying an electrical current such as, for example, copper wiring. The winding 74 is electrically connected to terminals (not shown) or to wires or electrical connects extending through housing 12 for connection to a system or circuit board of the engine, such as an engine control module, in which the vacuum pump is positioned. The system or circuit board (not shown) include circuitry for activating the solenoid assembly 16.

The vacuum pump 10 may include a cover 82 sealingly mated to the cap 27 on the atmosphere ATM side thereof. The cover 82, when present, protects the holes 62 and 64 from dust and debris. The cover 82 defines a plurality of holes 83 to allow the vacuum pump to still communicate with atmosphere. The vacuum pump 10 may include an adaptor 84 sealing mated to the cap 26 on the operating side thereof. Adaptor 84 includes a conduit 86 having sealing features 87 for sealingly engaging a hose or a tube (not shown) for a fluid-tight seal, which can connect the vacuum pump 10 to an operating system of an engine, such as a device requiring vacuum 102.

In operation, an exhaust condition occurs when the solenoid assembly 16 is activated and the plate of magnetic material 40 is attracted thereto. Here, the fluid (air) in the first chamber 18 is compressed and places a force on the check valve flaps at holes 22'a and 52. At hole 52 the check valve flap is held closed because the pressure is pressing it against cap 26. Conversely, at hole 22'a, the check valve flap is opened by the pressure, thereby exhausting the air from the first chamber. During this exhaust condition, the fluid (air) in the second chamber 19 is able to expand, decreasing the pressure therein. As such, the check valve flap at hole 22"a is held closed against the exterior of the housing 12 and the check valve flap at hole 54 can open if there is a pressure differential between the adaptor 84 and the second chamber 19 sufficient to push the flap into antechamber 28" toward the exterior of the housing 12, which is unlikely since it is connected to an operating system having a device requiring vacuum.

Then, when the solenoid assembly 16 is deactivated, i.e., no current is flowing to the winding 74, the plate of magnetic material 40 moves away from the solenoid assembly, thereby creating an intake condition. Here, the fluid (air) in the second chamber 19 is compressed and fluid (air) is drawn into the first chamber 18, which was previously evacuated to have a lower pressure, than the pressure inside the adaptor 84. As such, the check valve flap at hole 52 opens drawing air from the adaptor into the first chamber and the check valve flap at hole 22'a is held closed by atmospheric pressure acting to hold the check valve flap against the exterior of the housing. As the fluid (air) is compressed within the second chamber 19, the pressure holds the check valve flap at hole 54 against the cap 26, i.e., closed, and the check valve flap at hole 22"a can open if there is a pressure differential between atmosphere and the second chamber 19, the pressure in the second chamber being greater than atmosphere, sufficient for the fluid to push the flap into the antechamber 29".

Interestingly, the vacuum pump 10 has a construction that is operable such that the plate of magnetic material 40 of the piston 14 can be placed into resonance, bouncing repeatedly between an exhaust and an intake position for repeatable, continual generation of vacuum. To achieve this resonance, the solenoid assembly 16 is operated using a pulse modulation that excites the elastic base 30 at its natural frequency such that the vibrations at resonance of the elastic base 30 move the magnetic plate 40 to generate vacuum. As such, with a low energy input into the solenoid assembly, a higher than expected output of vacuum is generated. The pulse modulation may be pulse amplitude modulation, pulse width modulation, or pulse position modulation, if it can excite the elastic base 30 at its natural frequency to generate more linear translation of the elastic base than mere on and off cycling of the solenoid can produce. The vacuum pump 10 has many advantages: it is compact, efficient, affordable to manufacture, and is electrically controllable to ensure adequate vacuum levels for the device requiring vacuum whenever the operator or system requires the same. The vacuum pump provides high suction vacuum and high flow rate, and may be operated at a resonance condition. In one embodiment, it can move 5 cm$^3$ of fluid per cycle. It also is very efficient with electricity and the materials used to make it.

Figure 5:
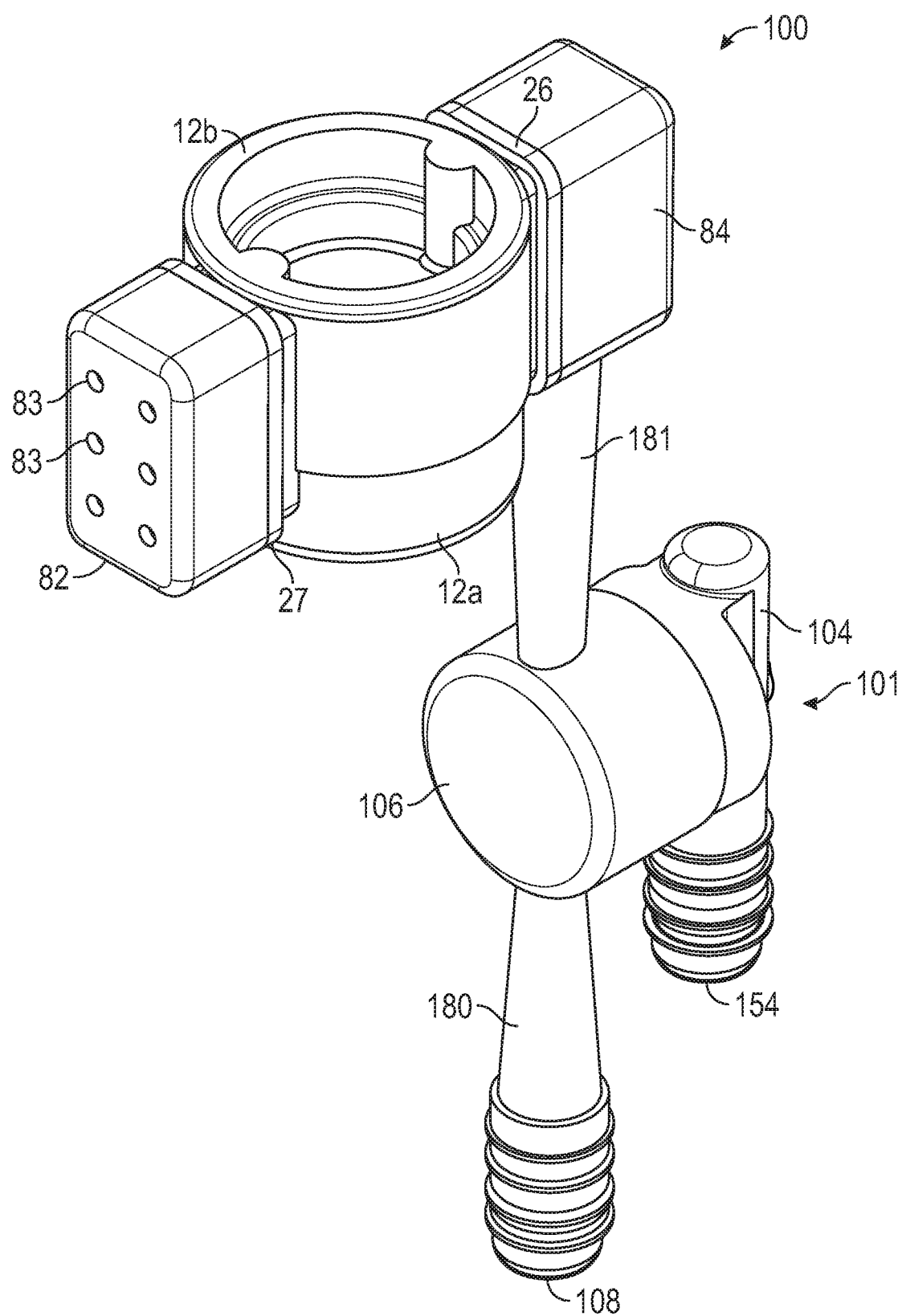
FIG. 5 is a side perspective view of an electrically actuated vacuum pump-Venturi device assembly.
Figure 6:
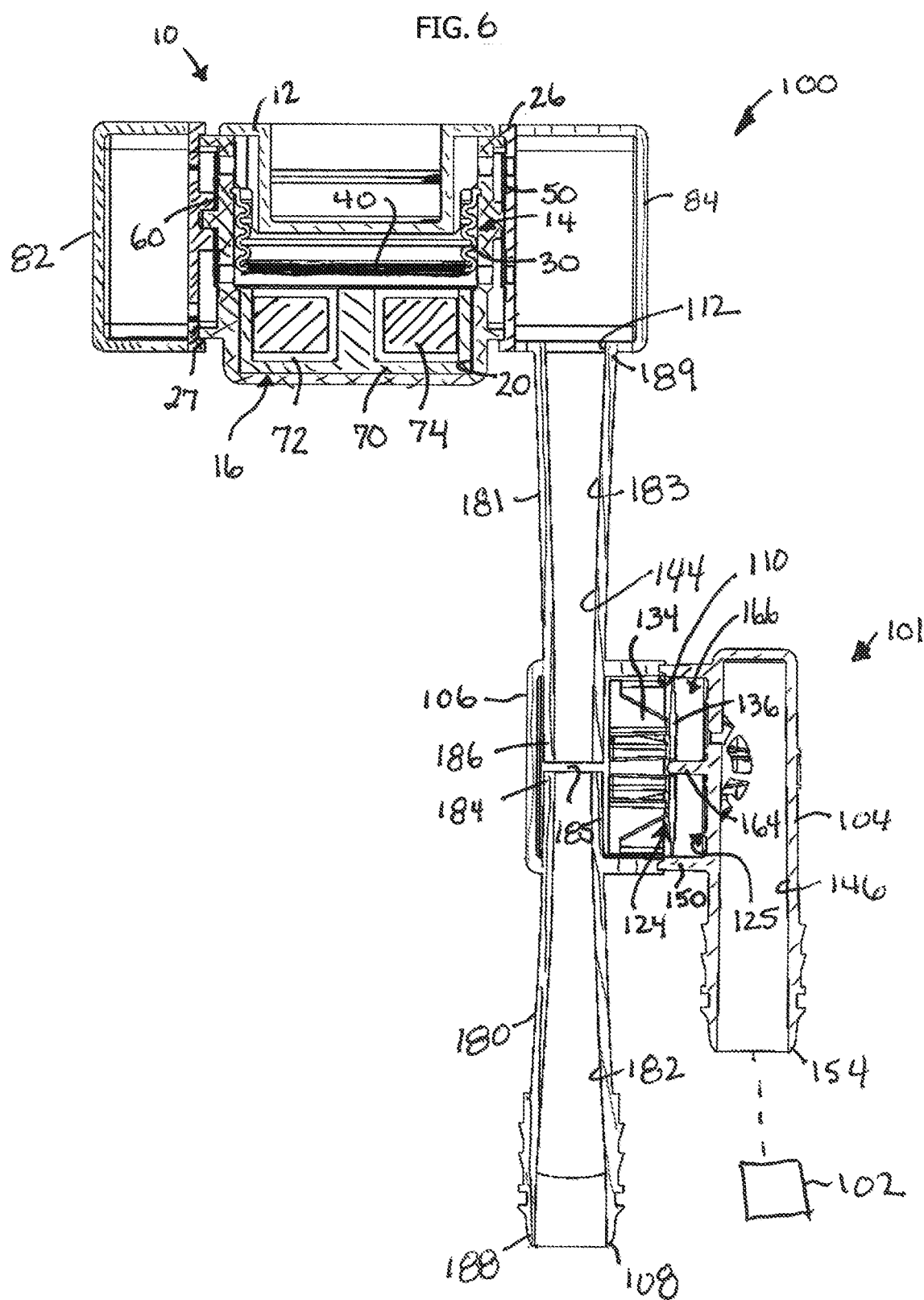
FIG. 6 is a longitudinal cross-section view of the vacuum pump-Venturi device assembly of FIG. 5.

Turning to FIGS. 5 and 6, the vacuum pump 10 has adaptor 84 integral or connected to the discharge port 112 of a Venturi device 100, which is referred to herein as a vacuum pump-Venturi device assembly, identified by reference number 100. The vacuum pump-Venturi device assembly 100 is for use in an engine, for example, in a vehicle's internal combustion engine to provide vacuum for use by a device requiring vacuum 102. The device requiring vacuum may be a vehicle brake boost device, a turbocharger waste gate actuator, heating and ventilation actuators, driveline actuators (e.g., four-wheel drive actuators), fuel vapor purging systems, engine crankcase ventilation, fuel system leak testing systems, automatic transmissions and/or air conditioners. The engine and all its components and/or subsystems are not shown in the figures, with the exception of a few boxes included to represent specific components of the engine as identified herein, and it is understood that the engine components and/or subsystems may include any commonly found in vehicle engines. While the embodiments in the figures are referred to as generically having a Venturi device, the Venturi device may be referred to as an "aspirator" when the motive port is connected to atmospheric pressure or as an "ejector" when the motive port is connected to boosted pressure, such as the pressures attributed to boosted air produced by a turbocharger.

The vacuum pump-Venturi device assembly 100 includes housing 101, which as illustrated is formed of an upper housing 104 and a lower housing 106, and vacuum pump 10. The designations of upper and lower portions are relative to the drawings as oriented on the page, here right and left, respectively, for descriptive purposes, and are not limited to the illustrated orientation when utilized in an engine system. Preferably, upper housing 104 is joined to lower housing 106 by sonic welding, heating, or other conventional methods for forming an airtight seal therebetween.

Referring to FIG. 6, the lower housing 106 defines passageway 144 which includes a plurality of ports, some of which are connectable to components or subsystems of the engine. The ports include: (1) a motive port 108; (2) a suction port 110; (3) a discharge port 112; and, optionally, (4) a bypass port as shown in co-owned U.S. Pat. No. 9,534,704. Check valves may be arranged downstream or upstream of any of these ports to prevent fluid from flowing in an undesirable direction. Here, suction port 110 of the lower housing 106 and the connecting portion 150 of the upper housing 104 define a chamber 166 and collectively form a check valve utilizing a floating plate-shaped seal member 136. The lower housing 106 defines a lower valve seat 124 within the chamber 166 comprising a plurality of radially spaced fingers 134 extending upwardly into the chamber. The radially spaced fingers 134 support the seal member 136 in an open position.

The passageway 144 in the lower housing 106 has an inner dimension along a central longitudinal axis that includes a first tapering portion 182 (also referred to herein as the motive cone) in the motive section 180 converging toward a second tapering portion 183 (also referred to herein as the discharge cone) in the discharge section 181, which diverges away therefrom, i.e., it tapers gradually, continuously from a smaller dimensioned inlet end 186 to a larger dimensioned outlet end 189. Here, the first tapering portion 182 and the second tapering portion 183 are aligned end to end (outlet end 184 of the motive section 180 to inlet end 186 of the discharge section 181), but are spaced apart a lineal distance thereby defining a Venturi gap 185. The Venturi gap 185 is in fluid communication with the chamber 166 and the outlet end 184 of the motive section 180 and the inlet end 186 of the discharge section 181 extend into the chamber 166. The chamber 166 extends around and below the outlet end 184 and the inlet end 186. Additionally, the radially spaced finger 134 have openings between them that enable fluid flow around and below the outlet end 184 and the inlet end 186.

The inlet ends 188, 186 and the outlet end 184, 189 may be any circular shape, elliptical shape, or some other polygonal form and the gradually, continuously tapering inner dimension extending therefrom may define, but is not limited to, a hyperboloid or a cone. Some example configurations for the outlet end 184 of the motive section 180 and inlet end 186 of the discharge section 181 are presented in co-pending U.S. patent application Ser. No. 14/294,727, filed Jun. 3, 2014, incorporated by reference herein in its entirety. The second tapering portion 183 may also form a junction with a bypass port proximate the outlet end 189 of the second tapering portion.

Still referring to FIG. 6, the upper housing 104 defines passageway 146 extending the length thereof and defines a plurality of ports, some of which are connectable to components or subsystems of the engine. The ports include: (1) the connecting portion 150 (defining the inlet port for chamber 166); and (2) a second port 154 connectable inlet connectable to a device requiring vacuum 102. The upper housing 104 includes an upper valve seat 125. Here, a pair of concentric annular beads projecting into chamber 166 form the upper valve seat 125 and a pin 164 extends downwardly into the chamber 166 as a guide for translation of the sealing member 136 within the chamber 166. Accordingly, the seal member 136 includes a bore therethrough sized and positioned for receipt of the pin 164.

In operation, the vacuum pump 10 operates as described above and during the intake condition, draws fluid flow through the Venturi device 101 from the motive section 180 toward the discharge section 181, thereby drawing suction through the upper housing 104 and the Venturi gap 185 to create a vacuum in the device requiring vacuum 102.

Figure 7:
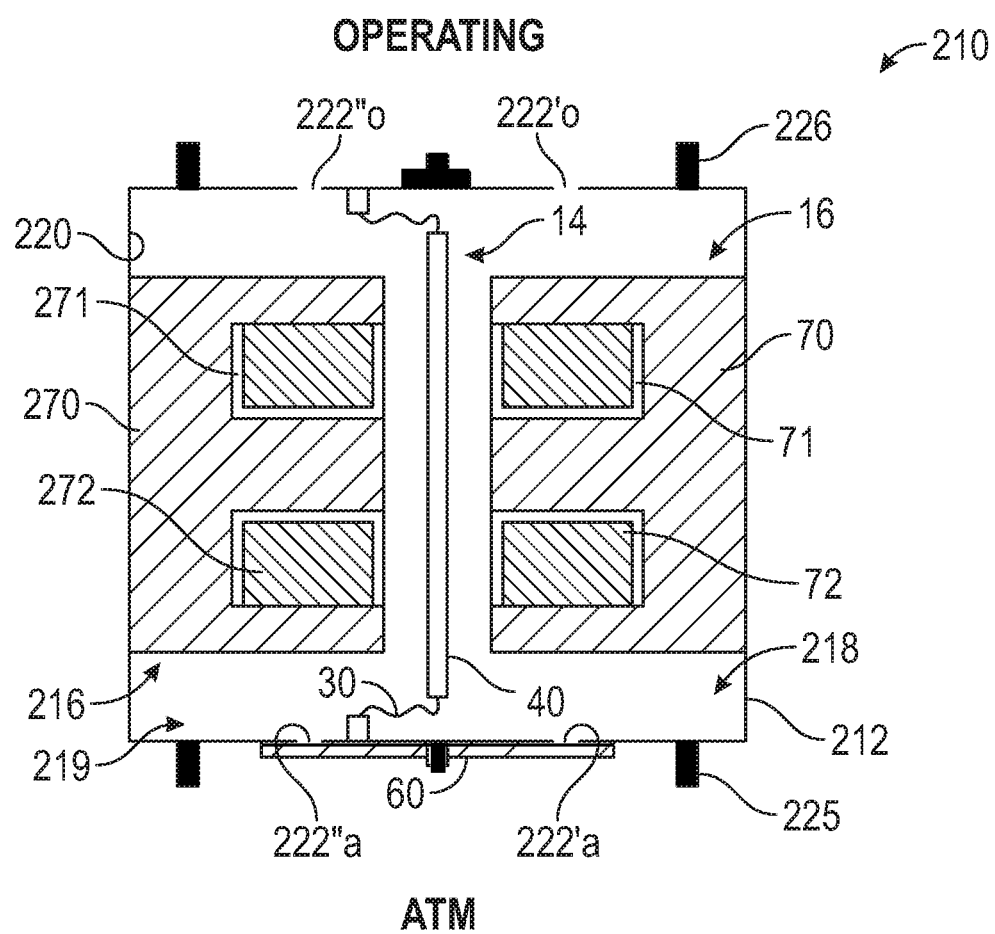
FIG. 7 is a longitudinal cross-section, plan view of a second embodiment of an electrically actuated vacuum pump.

Turning to FIG. 7, a second embodiment of a vacuum pump is illustrated, referred to by reference 210. The vacuum pump 210 is constructed similarly to vacuum pump 10 of FIGS. 1-4, but has a second solenoid assembly 216 opposite the first solenoid assembly 16 with the piston 14 therebetween in sealing engagement with the housing 212. The housing 212 will be shaped differently to make room for the second solenoid assembly, which has a core 270 housing a bobbin 271 full of winding 272 as described above with respect to vacuum pump 10. Housing 212 has a plurality of holes 22 for fluid communication between an exterior environment and the cavity 220, which the piston 14 (elastic base 30 and plate of magnetic material 40) divides into a first chamber 218 and a second chamber 219. The first and second chambers 218 and 219 will have a larger volume than those in vacuum pump 10. Two of the plurality of holes 222' are in fluid communication with the first chamber 218, with one hole 222'a for fluid communication with atmosphere ATM and the other hole 222'o for fluid communication with an operating system of an engine (device requiring vacuum 102), and another two of the plurality of holes 222" are in fluid communication with the second chamber 219, with one hole 222"a for fluid communication with atmosphere ATM and the other hole 222"o or fluid communication with an operating system (device requiring vacuum 102). The piston 14 is positioned within the cavity 220 to place the plate of magnetic material 40 within an operable range for magnetic attraction to the solenoid assembly 16 and to the second solenoid assembly 216.

As discussed above for vacuum pump 10, vacuum pump 210 has a first neck 225 when sealingly mated to a cap (not shown) will form a plurality of antechambers housing a check vale seated against the exterior of the housing 212 to close holes 222'a and 222"a and has a second neck 226 when sealing mated to an adaptor (not shown) will form a plurality of antechambers housing a check valve seated against the adaptor to close holes in the adaptor. In operation, when the plate of magnetic material 40 moves away from the first solenoid assembly 16, to the left in FIG. 7 by activation of the second solenoid assembly, an intake condition drawing air from the operating system into the first chamber 218 through 222'o just as in vacuum pump 10, but in addition, the check valve at hole 222"a in the second chamber will open. Then, in the "exhaust condition" of vacuum pump 10, when the plate of magnetic material 40 is attracted to the first solenoid assembly 16, the check valve at hole 222'a and at hole 222"o will open. As such, under both conditions an intake of fluid (air) from the operating system occurs. This combined action provides for double the flow rate of air for vacuum pump 210 compared to vacuum pump 10. In this embodiment, a resonance condition for the plate of magnetic material is possible between the two solenoid assemblies 16, 216.

Figure 8:
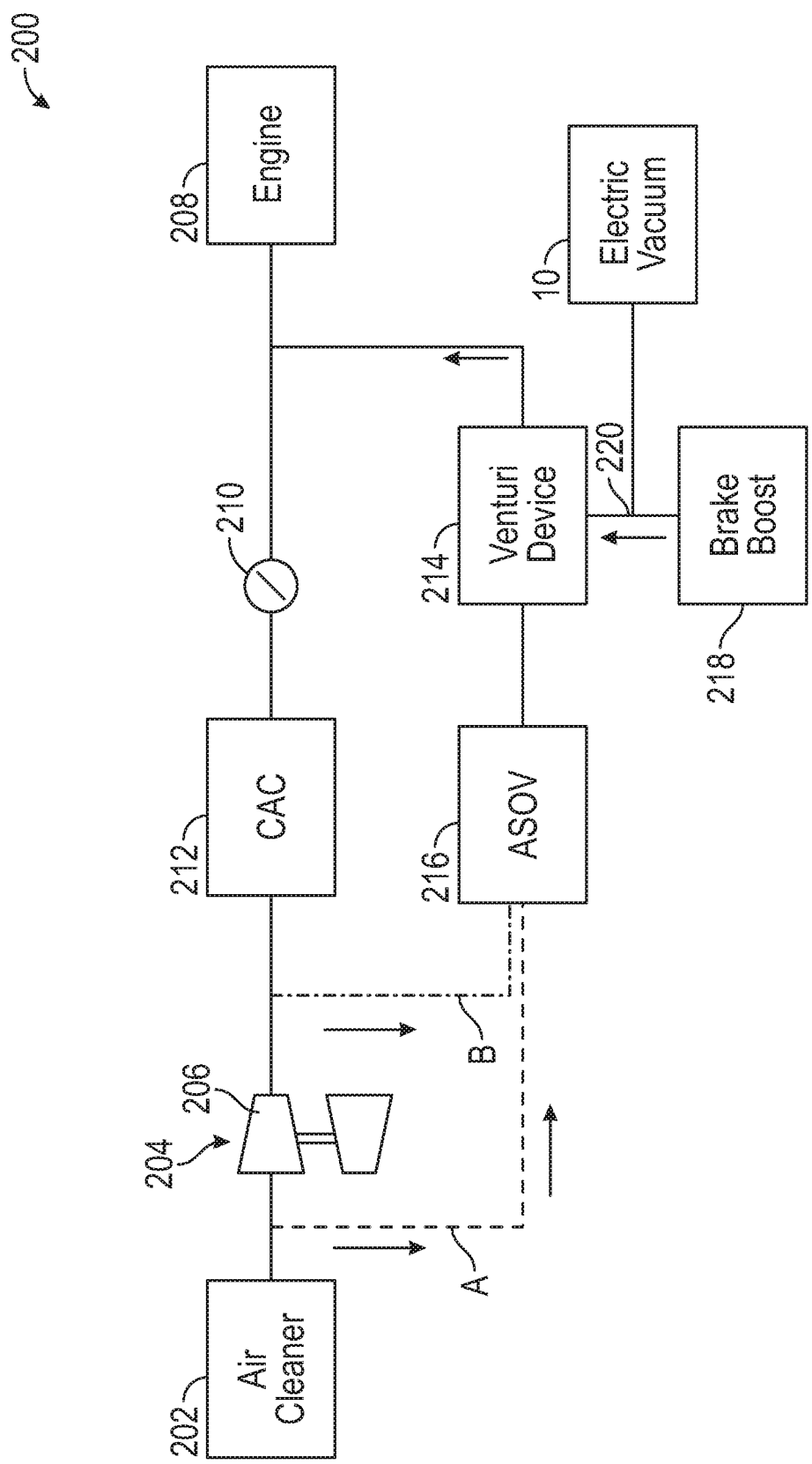
FIG. 8 is a schematic representation of a first embodiment of an engine system incorporating an electrically actuated vacuum pump.

Referring now to FIG. 8, the vacuum pump 10 is connected to an engine system 200 as illustrated, which is preferably a start-stop engine. The engine system 200 comprises an air filter or cleaner 202 connected to atmosphere, a turbocharger 204 having a compressor 206 sending boost pressure to the engine 208. Between the compressor 206 and the engine 208 is a throttle 210 and a charge air cooler 212, the charge air cooler being upstream of the throttle 210. The engine system 200 also has two options for a bypass around the throttle 210. Option 1 is a bypass around the throttle 210 that begins upstream of the compressor 206 (path A). Option 2 is a bypass around the throttle 210 that begins downstream of the compressor 206 (path B). Within either bypass A or B there is a Venturi device 214, such as a Venturi device in U.S. Pat. Nos. 9,827,963, 9,534,704, and U.S. Ser. No. 10/024, 458, controlled by an automated shut off valve (ASOV) 216, which if path A is selected, operates the Venturi device 214 as an aspirator and if path B is selected, operates the Venturi device 214 as an ejector. Here, the Venturi device 214 is illustrated as being connected to a brake boost system 218 as the device requiring vacuum and the electrically actuated vacuum pump 10, described herein, is connected to the same port of the brake boost system 218 as the Venturi device's suction port 220 to provide vacuum to the brake boost system 218 as a supplement or replacement to the vacuum provided by the Venturi device. In particular, the vacuum pump 10 is operable to supply vacuum to the brake boost system 218 or any other device requiring vacuum to which it may be connected when the engine 208 is not running, i.e., is in a stop condition of a start-stop cycle of the engine.

Figure 9:
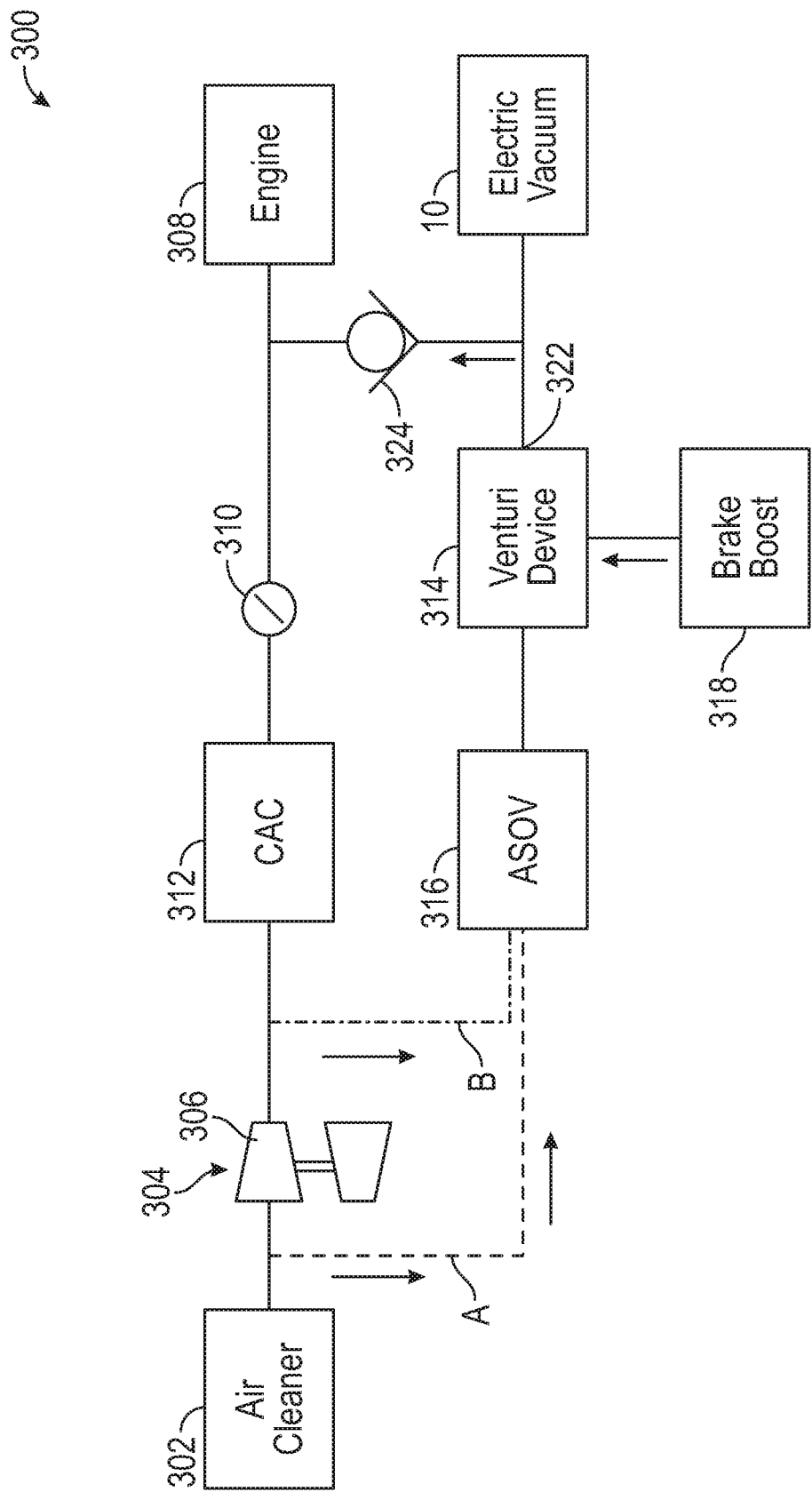
FIG. 9 is a schematic representation of a second embodiment of an engine system incorporating an electrically actuated vacuum pump.

Referring now to FIG. 9, the vacuum pump 10 is connected to an engine system 300 as illustrated, which is preferably a start-stop engine. The engine system 300 comprises an air filter or cleaner 302 connected to atmosphere, a turbocharger 304 having a compressor 306 sending boost pressure to the engine 308. Between the compressor 306 and the engine 308 is a throttle 310 and a charge air cooler 312, the charge air cooler being upstream of the throttle 310. The engine system 300 also has two options for a bypass around the throttle 310. Option 1 is a bypass around the throttle 310 that begins upstream of the compressor 306 (path A). Option 2 is a bypass around the throttle 310 that begins downstream of the compressor 306 (path B). Within either bypass A or B there is a Venturi device 314, such as a Venturi device in U.S. Pat. Nos. 9,827,963, 9,534,704, and U.S. Ser. No. 10/024, 458, controlled by an automated shut off valve (ASOV) 216, which if path A is selected, operates the Venturi device 314 as an aspirator and if path B is selected, operates the Venturi device 314 as an ejector. Here, the Venturi device 314 is illustrated as being connected to a brake boost system 318 as the device requiring vacuum and the electrically actuated vacuum pump 10, described herein, is connected to the discharge port 322 of the Venturi device 314 to cause vacuum to be generated by the Venturi device 314 during an intake condition of the vacuum pump 10, which is set to occur when the engine is not running, i.e., is in a stop condition of a start-stop cycle of the engine, so that vacuum continues to be produced and provided to the brake boost system 318 or any other device requiring vacuum substituted for the brake boost system 318. In this configuration, the bypass A and B also includes a check valve 324 between the engine 308 and the discharge port 322 of the Venturi device 314 that prevents fluid from flowing through the Venturi device 314 in the wrong direction.

Figure 10:
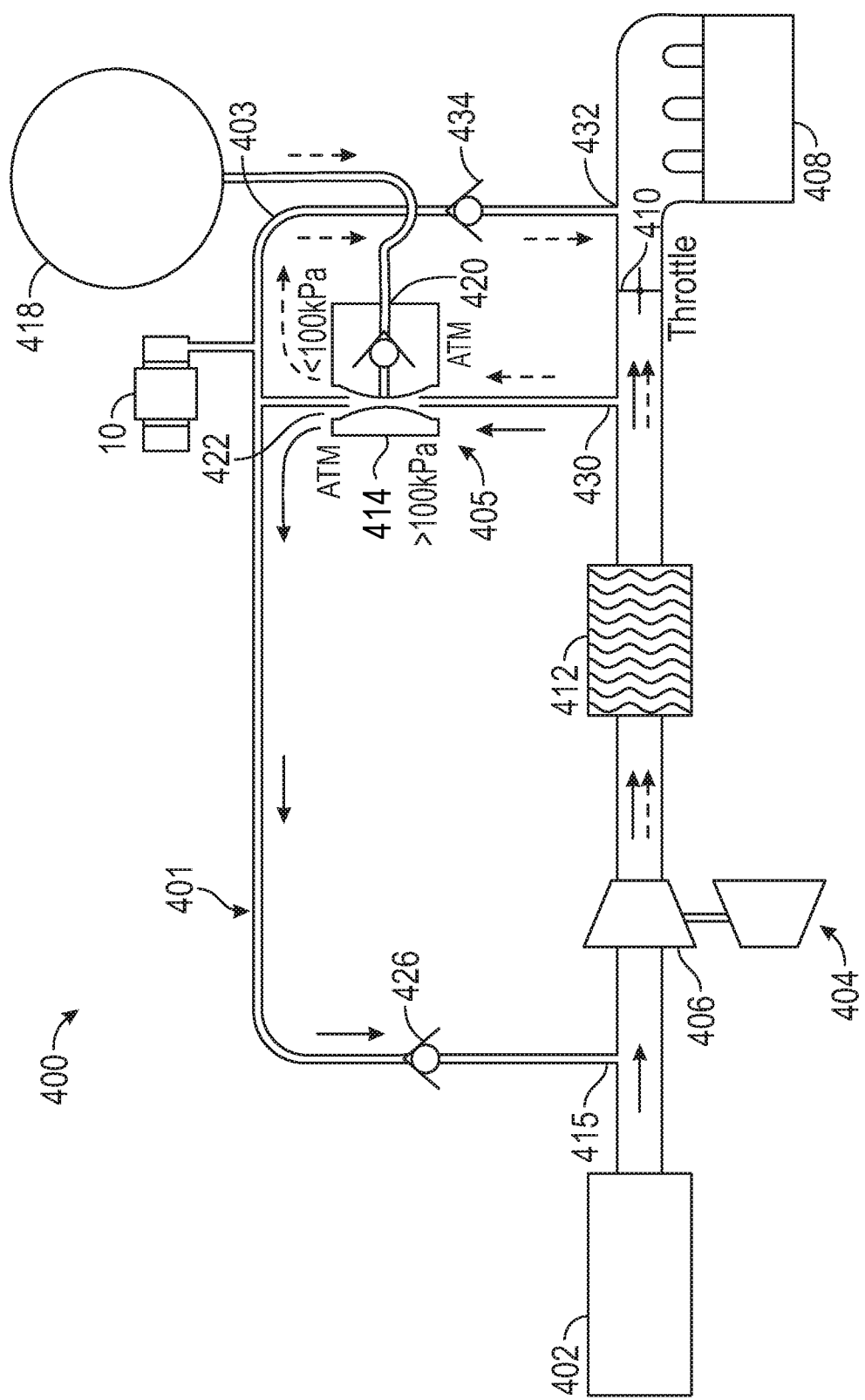
FIG. 10 is a schematic representation of a fourth embodiment of an engine system incorporating an electrically actuated vacuum pump.

Referring now to FIG. 10, the vacuum pump 10 is connected to an engine system 400 as illustrated, which is preferably a start-stop engine. The engine system 400 comprises an air filter or cleaner 402 connected to atmosphere, a turbocharger 404 having a compressor 406 sending boost pressure to the engine 408. Between the compressor 406 and the engine 408 is a throttle 410 and a charge air cooler 412, the charge air cooler being upstream of the throttle 410. The engine system 400 has a first bypass 401 around the compressor 406 that begins downstream of the compressor 406, but upstream of the throttle, and returns air to a position 415 upstream of the compressor 406 as represented by the flow path of the solid arrows in FIG. 10. Within the first bypass 401 there is a Venturi device 414, such as a Venturi device in U.S. Pat. Nos. 9,827,963, 9,534,704, and U.S. Ser. No. 10/024,458 with or without its own internal bypass, and a check valve 426 between the Venturi device 414 and the return position 415 upstream of the compressor. The Venturi device 414 has a suction port 420 in fluid communication with a device requiring vacuum 418, which may be a brake boost canister, a fuel purge canister, a crankcase ventilation systems, etc.

Still referring to FIG. 10, additionally, the engine system 400 has a second bypass 403, which is a bypass around the throttle 410 from an upstream side 430 of the throttle to a downstream side 432 of the throttle. The second bypass 403 shares a common portion 405 of the first bypass 401 that comprises the Venturi device 414. The second bypass 403 has a check valve 434 positioned between the Venturi device 414 and the downstream side 432 of the bypass and the vacuum pump 10, described herein, connected to the discharge port 422 of the Venturi device 414 upstream of check valve 434. Here, the Venturi device 414 is illustrated as being connected to a device requiring vacuum 418 and the electrically actuated vacuum pump 10, will cause vacuum to be generated by the Venturi device 414 during an intake condition of the vacuum pump 10, which is set to occur when the engine is not running, i.e., is in a stop condition of a start-stop cycle of the engine, so that vacuum continues to be produced and provided to the device requiring vacuum 418.

With respect to the engine systems illustrated in FIGS. 8 to 10, in all aspects the electric vacuum pump produces about 10 kPa to about 15 kPa of vacuum. This amount of vacuum is enough to create a pressure drop across the Venturi devices 314 and 414 to produce vacuum via the Venturi device.

Also disclosed is a method of operating any one of the start-stop engine systems of FIGS. 8 to 10. The method includes firstly, providing a start-stop engine system 200, 300, or 400 according to any one of the embodiments above, and then, during a stop condition of the start-stop engine system, sending a pulse modulated signal of power from a power source (not shown) to the solenoid within the electric vacuum pump 10 to activate the piston 14 to translate toward and then away from the solenoid 16 repeatedly at a natural resonance frequency of the piston. The natural resonance frequency is typically that of the elastic base 30. In all embodiments, the pulse modulation is selected from pulse width modulation, pulse amplitude modulation, and pulse position modulation. In some embodiments, the pulse modulation is pulse width modulation. In all embodiments, the electric vacuum pump 10 produces about 10 kPa to about 15 kPa of vacuum.

Although the invention is shown and described with respect to certain embodiments, it is obvious that modifications will occur to those skilled in the art upon reading and understanding the specification, and the present invention includes all such modifications.

What is claimed is:

1. A vacuum pump comprising:
   a housing defining a cavity and defining a plurality of holes for fluid communication between an exterior environment and the cavity;
   a first solenoid assembly enclosed within the cavity of the housing;
   a piston enclosed within the housing, the piston comprising an elongate elastic base having a first open end sealingly closed by a plate of magnetic material and having a second open end sealingly connected to the housing, wherein the elongate elastic base has spring characteristics to bias the plate of magnetic material toward the solenoid assembly and defines a first chamber inside the elongate elastic base and a second chamber on an opposite side of the piston;
   wherein the piston is positioned to place the plate of magnetic material within an operable range for magnetic attraction to the solenoid assembly for oscillations at resonance;
   wherein two of the plurality of holes are in fluid communication with the first chamber, with one hole for fluid communication with atmosphere and the other hole for fluid communication with an operating system of an engine, and another two of the plurality of holes are in fluid communication with the second chamber, with one hole for fluid communication with atmosphere and the other hole for fluid communication with the operating system; and
   a plurality of antechambers defined between the housing and caps seated against the housing, one each of the plurality of antechambers being in fluid communication with one of the plurality of holes of the housing;
   wherein a first check value on the atmosphere side of the vacuum pump is seated against the exterior of the housing to sealingly cover the plurality of holes in the housing and a second on the operating system side of the vacuum pump is seated against a first cap of the caps mated to the housing to sealingly cover an inlet and/or an outlet in the first cap of the caps that are in fluid communication with the operating system.

2. The vacuum pump of claim 1, wherein the solenoid assembly comprises a core defining a cavity recessed therein in which is seated a bobbin housing a winding.

3. The vacuum pump of claim 1, further comprising a Venturi device sealing connected to the two holes of the plurality of holes of the housing that are positioned for fluid communication with the operating system.

4. The vacuum pump of claim 1, wherein the plate of magnetic material is a permanent magnet.

5. The vacuum pump of claim 1, further comprising a second solenoid assembly acting on the plate of magnetic material in a direction opposite the first solenoid assembly.

6. The vacuum pump of claim 1, wherein the solenoid is pulse modulated at a rate equivalent to a natural frequency of vibration of the elastic base of the piston.

7. The vacuum pump of claim 1, wherein the first and second check valves are an elongate elastomeric member defining a first flap and a second flap to releasably, sealingly cover two of the plurality of holes in either the housing or the cap.

8. A start-stop engine system comprising:
   a turbocharger having a compressor directing air flow to a throttle;
   an engine downstream of the throttle;
   a bypass having fluid flow from upstream of the compressor or downstream of the compressor to a position between the throttle and the engine, the bypass comprising a Venturi device that generates vacuum;
   a device requiring vacuum in fluid communication with a suction port of the Venturi device; and
   an electronic vacuum pump according to claim 1 in fluid communication with the device requiring vacuum or with the Venturi device;
   wherein the electronic vacuum pump is operable during a stop condition of the start-stop engine to replace the vacuum generated by the Venturi device or to provide a pressure drop across the Venturi device so the Venturi device continues to generate vacuum for the device requiring vacuum.

9. The start-stop engine system of claim 8, wherein the device requiring vacuum is a brake boost system.

10. The start-stop engine system of claim 9, further comprising, within the bypass, a check valve downstream of the Venturi device.

11. The start-stop engine system of claim 8, further comprising an automated shut off valve in the bypass upstream of the Venturi device.

12. The start-stop engine system of claim 8, wherein the electronic vacuum pump is in fluid communication with a discharge port of the Venturi device to provide a pressure drop across the Venturi device so the Venturi device continues to generate vacuum for the device requiring vacuum during the stop condition.

13. A method of providing vacuum in a start-stop engine system, the method comprising:
providing a start-stop engine system of claim 8; and
during a stop condition of the start-stop engine system, sending a pulse modulated signal of power to the solenoid within the electric vacuum pump to activate the piston to translate toward and then away from the solenoid repeatedly at a natural resonance frequency of the piston.

14. A start-stop engine system comprising:
a turbocharger having a compressor directing air flow to a throttle;
an engine downstream of the throttle;
a first bypass having fluid flow from between the compressor and throttle to a position upstream of the compressor, the first bypass comprising a Venturi device that generates vacuum;
a device requiring vacuum in fluid communication with a suction port of the Venturi device; and
a second bypass having fluid flow from between the compressor and throttle to a position between the throttle and the engine, the second bypass sharing the portion of the first bypass comprising the Venturi device,
an electronic vacuum pump according to claim 1 in fluid communication with a discharge port of the Venturi device;
wherein the electronic vacuum pump is operated during a stop condition of the start-stop engine to provide a pressure drop across the Venturi device so the Venturi device continues to generate vacuum for the device requiring vacuum.

15. The start-stop engine system of claim 14, wherein the device requiring vacuum is a brake boost system.

16. The start-stop engine system of claim 15, further comprising, within the second bypass, a check valve downstream of the Venturi device and downstream of the electronic vacuum pump.

17. The start-stop engine system of claim 14, wherein the device requiring vacuum is a vacuum canister.

18. The start-stop engine system of claim 14, wherein the electronic vacuum pump is in fluid communication with a discharge port of the Venturi device to provide a pressure drop across the Venturi device so the Venturi device continues to generate vacuum for the device requiring vacuum during the stop condition.

19. The start-stop engine system of claim 18, further comprising, within the first bypass, a check valve between the Venturi device and the position upstream of the compressor.

20. A method of providing vacuum in a start-stop engine system, the method comprising:
providing a start-stop engine system of claim 14; and
during a stop condition of the start-stop engine system, sending a pulse modulated signal of power to the solenoid within the electric vacuum pump to activate the piston to translate toward and then away from the solenoid repeatedly at a natural resonance frequency of the piston.

* * * * *

UNITED STATES PATENT AND TRADEMARK OFFICE
CERTIFICATE OF CORRECTION

PATENT NO. : 10,677,239 B2
APPLICATION NO. : 16/138270
DATED : June 9, 2020
INVENTOR(S) : Keith Hampton et al.

Page 1 of 1

It is certified that error appears in the above-identified patent and that said Letters Patent is hereby corrected as shown below:

In the Claims

Column 10, Line 9 "value" should read -- valve --

Column 10, Line 12 "a second on" should read -- a second check valve --

Signed and Sealed this
Twenty-first Day of July, 2020

Andrei Iancu
*Director of the United States Patent and Trademark Office*